United States Patent [19]

Keskey et al.

[11] Patent Number: 5,047,463

[45] Date of Patent: Sep. 10, 1991

[54] CAST CEILING TILES CONTAINING LATEXES AS BINDERS

[75] Inventors: William H. Keskey; Kenneth R. Meath, both of Midland, Mich.

[73] Assignee: The Dow Chemical Company, Midland, Mich.

[21] Appl. No.: 318,093

Related U.S. Application Data

[62] Division of Ser. No. 146,947, Jan. 22, 1988, Pat. No. 4,861,822.

[22] Filed: Mar. 2, 1989

[51] Int. Cl.$^5$ .......................... C08K 3/34; C08K 3/26; C08L 39/00

[52] U.S. Cl. ....................................... 524/426; 264/69; 524/427; 524/446; 524/447; 524/451; 524/456; 524/533; 524/559

[58] Field of Search ............... 524/559, 533, 426, 446, 524/447, 427, 451, 456; 264/69

[56] References Cited

U.S. PATENT DOCUMENTS

| | | | |
|---|---|---|---|
| 3,955,031 | 5/1976 | Jones et al. | 428/537.7 |
| 4,433,022 | 2/1984 | Schwartz et al. | 428/904.4 |
| 4,861,822 | 8/1981 | Keskey et al. | 524/559 |
| 4,863,979 | 9/1989 | Beyersdorf et al. | 524/445 |

*Primary Examiner*—Herbert J. Lilling

[57] ABSTRACT

Cast ceiling tile requires a particular rheology of its wet formulation for the dried tile to have a desired aesthetic appearance. The use of a latex binder rather than starch for cast ceiling tiles imparts the necessary rheological properties to the wet ceiling tile formulation. The tile is prepared by blending mineral wool with a premixture of water, latex, and filler, said premixture having a sharp yield point when measured with a recording Brookfield Viscometer. The latex is an alkali-swellable latex comprising (i) a $C_3$–$C_8$ $\alpha,\beta$-ethylenically unsaturated carboxylic acid monomer in an amount from about 15 to about 60 weight percent based on the weight of the monomers in the cpolymers; (ii) at least one of a copolymerizable nonionic vinyl monomer in an amount from about 45 to about 30 weight percent based on the weight of the monomers in the copolymer and (iii) an additional late feed of nonionic vinyl monomer in an amount from about 10 to about 40 weight percent based on the weight of the monomers in the copolymer.

16 Claims, 3 Drawing Sheets

CAST CEILING TILES CONTAINING LATEXES AS BINDERS

This is a division of application Ser. No. 146,947, filed Jan. 22, 1988, now U.S. Pat. No. 4,861,822.

BACKGROUND OF THE INVENTION

The present invention relates to cast tiles, particularly cast ceiling tiles which are manufactured by a process which requires particular rheological properties of the paste from which the tile is made. The paste is essentially made up of a binder and filler. Normally, to acquire the proper rheological properties, the paste contains starch as the binder. The rheological properties of the paste are necessary because during the manufacture of the cast ceiling tile, the compound breaks down under the shear of an oscillating bar which imparts a unique surface to the cast ceiling tile.

Unfortunately, starch requires long, costly drying cycles and is hydroscopic, therefore, the finished cast ceiling tiles absorb moisture. The absorbed moisture causes sagging and warping of the installed cast ceiling tiles. A desirable binder would therefore have the proper rheological properties when combined with mineral wool and the filler and at the same time would not require long drying cycles and would not be as hydroscopic as starch. Accordingly, the present invention is such a binder for cast ceiling tile.

SUMMARY OF THE INVENTION

The present invention is related to a binder for cast ceiling tile which comprises an alkali-swellable latex comprising (i) a $C_3$–$C_8$ $\alpha,\beta$-ethylenically unsaturated carboxylic acid monomer in an amount from about 15 to about 60 weight percent based on the weight of the monomers in the copolymer; (ii) at least one of a copolymerizable nonionic vinyl monomer in an amount from about 45 to about 30 weight percent based on the weight of the monomers in the copolymer and (iii) an additional late feed of nonionic vinyl monomer in an amount from about 10 to about 40 weight percent based on the weight of the monomers in the copolymer wherein when said latex is mixed with fillers and water to form a mixture, the mixture has a sharp yield point when measured with a recording Brookfield Viscometer.

Another aspect of the present invention is cast ceiling tile which comprises a molded and dried mixture, the mixture comprising water, mineral wool, alkali-swellable latex, and filler, wherein the mixture is formed by blending the mineral wool with a premixture of water, alkali-swellable latex, and filler, said premixture having a sharp yield point when measured with a recording Brookfield Viscometer.

Yet another aspect of the present invention is a process for preparing cast ceiling tile which comprises:
(1) preparing a paste comprising:
 (a) filler
 (b) water; and
 (c) an alkali-swellable latex comprising:
  (i) a $C_3$–$C_8$ $\alpha,\beta$-ethylenically unsaturated carboxylic acid monomer in an amount from about 15 to about 60 weight percent based on the weight of the monomers in the copolymer;
  (ii) at least one of a copolymerizable nonionic vinyl monomer in an amount from about 45 to about 30 weight percent based on the weight of the monomers in the copolymer; and
  (iii) an additional late feed of nonionic vinyl monomer in an amount from about 10 to about 40 weight percent based on the weight of the monomers in the copolymer, filler and water;
(2) adjusting the pH of the paste to greater than about 8, wherein said pH adjusted paste has a sharp yield point when measured with a recording Brookfield Viscometer;
(3) combining the paste with mineral wool to form a mixture, wherein the mixture yields under an oscillating bar;
(4) molding the mixture; and
(5) drying the mixture.

DETAILED DESCRIPTION OF THE INVENTION

Figure 1:
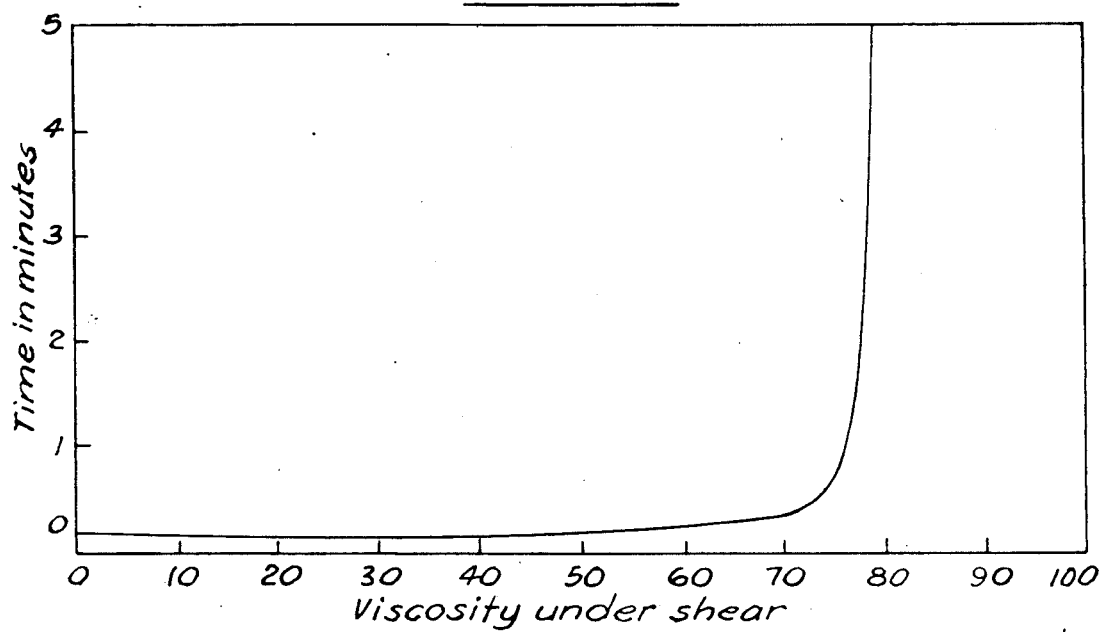
Figure 2:
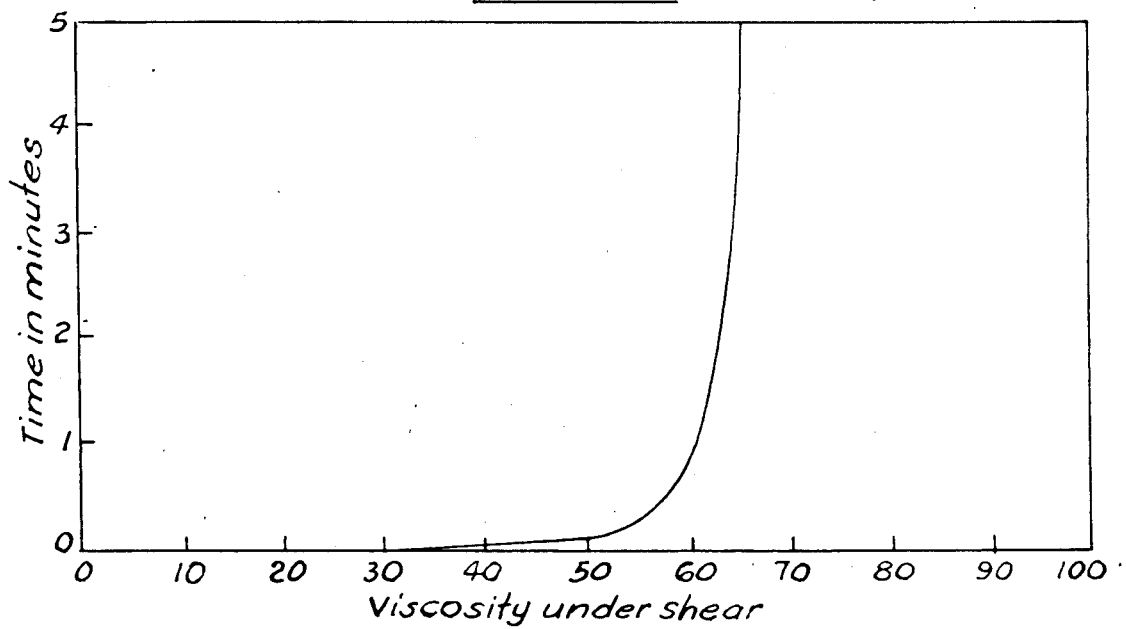
Figure 3:
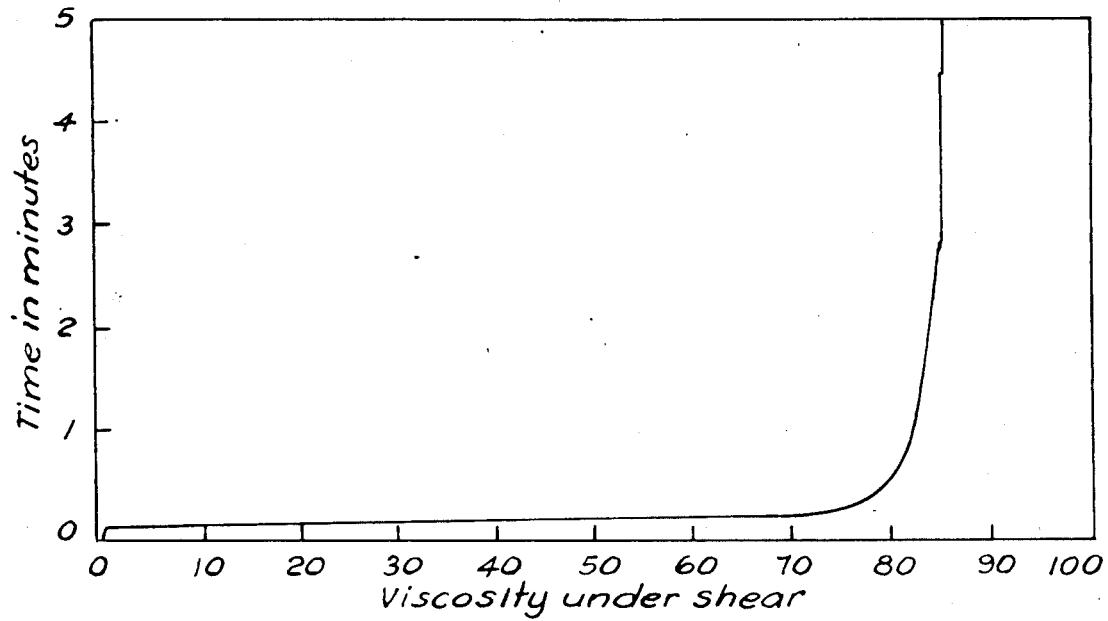

The latex useful as the binder in the present ceiling tile is an alkali-swellable latex prepared by conventional emulsion polymerization techniques. Alkali-swellable latexes are those carboxylate containing latexes which when neutralized with a basic solution thicken to a heavy gel. Such thickening is thought to impart the rheological properties necessary for the binder in the ceiling tile. Examples of such latexes include latexes which comprise three monomeric components. The components are: (i) a $C_3$–$C_8$ $\alpha,\beta$-ethylenically unsaturated carboxylic acid monomer in an amount from about 15 to about 60 weight percent based on the weight of the monomers in the copolymer; (ii) at least one of a copolymerizable nonionic vinyl monomer in an amount from about 45 to about 30 weight percent based on the weight of the monomers in the copolymer and (iii) an additional late feed of nonionic vinyl monomer in an amount from about 10 to about 40 weight percent based on the weight of the monomers in the copolymer. A "late" feed is defined as a second monomer stream of nonionic vinyl monomer added to the polymerization vessel after beginning the initial monomer stream addition of a $C_3$–$C_8$ $\alpha,\beta$-ethylenically unsaturated carboxylic acid monomer and nonionic vinyl monomer to the polymerization vessel. Preferably, the initial monomer stream addition is completed before the late feed addition begins.

The effectiveness of these latexes as pH responsive, alkali-swellable latexes, is dependent on the three components. The acid component provides the requisite pH responsiveness. The nonionic vinyl comonomer provides a extended polymer backbone and added hydrophilic lipophilic balance and the late feed of the nonionic vinyl monomer is thought to contribute to the rheology of the aqueous system. The proportions of the individual monomers can be varied to achieve the optimum properties for the cast ceiling tile. The latex requires from about 15 to about 60 weight percent based on total monomers of a $C_3$–$C_8$ $\alpha,\beta$-ethylenically unsaturated carboxylic acid monomer of the formula:

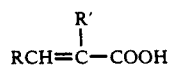

where
R is H and R' is H, $C_1$–$C_4$ alkyl, or —$CH_2COOX$; R is —COOX and R' is H or $CH_2COOX$; or R is $CH_3$ and R' is H; and X is H or $C_1$–$C_4$ alkyl.

Acrylic or methacrylic acid or a mixture thereof with itaconic or fumaric acid are preferred acid monomer, but crotonic and aconitic acid and half esters of these and other polycarboxylic acids such as maleic acid with $C_1-C_4$ alkanols are also suitable, particularly if used in a minor amount in combination with acrylic or methacrylic acid. Mixtures of two or more of the polycarboxylic acids are also suitable. For most purposes, it is preferable to have at least about 20 weight percent acid monomer based on total weight of monomers present in the copolymer. However, polycarboxylic acid monomers and half esters can be substituted for a portion of the acrylic or methacrylic acid, e.g., about 1 to 10 weight percent based on total monomers.

To provide the extended polymer backbone and body needed for effective thickening requires about 85 to about 40 total weight percent of at least one copolymerizable nonionic $C_2-C_{12}$ $\alpha,\beta$-ethylenically unsaturated vinyl monomer selected from the group consisting of the formula:

$$CH_2=CYZ$$

where
Y is H and Z is $-COOR$, $-C_6H_4R'$, CN, Cl, $$-\overset{\overset{O}{\|}}{O}CR''$$

or $CH=CH_2$;
Y is $CH_3$ and Z is $-COOR$, $-C_6H_4R'$, CN or $CH=CH_2$; or
Y and Z are Cl; and
R is $C_1-C_8$ alkyl or $C_2-C_8$ hydroxyalkyl;
R' is H, Cl, Br, or $C_1-C_4$ alkyl;
R'' is $C_1-C_8$ alkyl.

Typical of such monomers are the $C_1-C_8$ alkyl and $C_2-C_8$ hydroxyalkyl esters of acrylic and methacrylic acid including ethyl acrylate, ethyl methacrylate, methyl methacrylate, 2-ethylhexyl acrylate, butyl acrylate, butyl methacrylate, 2-hydroxyethyl acrylate, 2-hydroxybutyl methacrylate; styrene, vinyltoluene, t-butylstyrene, isopropylstyrene, and p-chlorostyrene; vinyl acetate, vinyl butyrate, vinyl caprolate; acrylonitrile, methacrylonitrile, butadiene, isoprene, vinyl chloride vinylidene chloride, and the like. In practice, a monovinyl ester such as ethyl acrylate or a mixture thereof with styrene, hydroxyethyl acrylate, acrylonitrile, vinyl chloride or vinyl acetate is preferred. The nonionic vinyl monomer described hereinabove can be a mixture of comonomers.

Conventional chain transfer agents such as, for example, n-dodecyl mercaptan, bromoform, carbon tetrachloride and the like can also be employed in the normal fashion in polymerization to regulate the molecular weight of the polymer formed therein, and, typically, when such chain transfer agents are used, they are employed in amounts ranging from 0.01 to about 10 (preferably from 0.1 to about 5) weight percent based upon the weight of the monomers employed in the polymerization. The amount of chain transfer agent employed depends somewhat on the particular transfer agent employed and the particular monomers being polymerized.

Similarly, conventional crosslinking agents, which can be a di-, tri- or tetra-vinyl compound and the like, can also be employed in the normal fashion in polymerization to regulate the Tg and the molecular weight of the polymer formed therein. Representative examples of a crosslinking agent are a divinylbenzene, allyl methacrylate or a mono-, di-, tri- or tetra-ethylene glycol diacrylate or dimethacrylate. Typically, when such crosslinking agents are used, they are employed in amounts ranging from about 0.01 to about 4.0 (preferably from about 0.1 to about 1.0) weight percent based upon the weight of the monomers employed in the polymerization. The amount of crosslinking agent employed depends on the monomers being polymerized.

The typical filler used in ceiling tiles is kaolin clay etc. which can be used with the mineral wool to make the cast ceiling tile. Additional appropriate fillers useful in the present invention are talc, calcium carbonate, and wollastonite.

Normally in preparing the ceiling tile a defoamer is necessary to prevent froth in the resultant latex based, ceiling tiles. The froth imparts low densities to the ceiling tile which is undesirable. Ceiling tiles made with starch normally have a density of about 25 lbs/ft$^3$. Ceiling tile made with latex and no defoamer yields ceiling tile with densities of about 12 lbs/ft$^3$. A defoamer should be selected to yield a ceiling tile having a density of at least about 20 lbs/ft$^3$. An example of such a defoamer is Q2-3183A Antifoam from Dow Corning® (polydimethylsiloxane, polypropylene glycol and silica).

Appropriate thickeners can also be added to the tile formulation, such as guar gum, xanthane gum, supplied by Charles Pfizer and Company, etc.

Polymerization Conditions for the Latex

The preparation of the latex is by conventional emulsion polymerization processes. Typically, the latex is prepared in a nitrogen purged, temperature controlled reactor, containing water and a surfactant. Normally, the monomers are continuously added to a reactor for polymerization over approximately 240 minutes. The initial monomer feeds of the $\alpha,\beta$-ethylenically unsaturated carboxylic acid and nonionic vinyl monomer are normally added continuously over about 170 to about 210 minutes. The late feed is normally added continuously beginning after the completion of the initial monomer feeds from about 170 to about 210 minutes, to about 240 minutes depending on the amount added. For example, if the late feed is to be added in an amount of about 10 weight percent and the initial feed is completed at 210 minutes, the late feed can be added at about 210 minutes or if the late feed is to be added in an amount of about 30 weight percent and the initial feed is completed at 170 minutes then the late feed can be added at about 170 minutes.

A stream of water, sodium hydroxide, sodium persulfate; and surfactant is also added to the reactor simultaneously with the monomer stream. Finally, the reactor remains heated at a constant temperature for about an hour and is then cooled.

Preparing the Ceiling Tile

A typical paste is formulated from about 50 to about 90 weight percent water, preferably the amount of water is from about 85 to about 90 weight percent based on the weight of the paste formulation. Clay is added in an amount of from about 1 to about 20 weight percent based on the weight of the paste formulation. The preferred amount of clay is from about 4 to about 10 weight percent based on the weight of the paste formulation. The amount of latex added is normally from about 1 to about 20 weight percent, more preferred from about 3 to about 10 weight percent based on the weight of the paste formulation. The latex added is normally from about 30 to about 50 percent solids. Preferably, the latex is added in an amount of about 40 percent solids.

The pH of the latex paste is then adjusted with 20 percent basic solution to a pH of from about 8 to about 10. The pH of the latex paste should be greater than about 8. Examples of preferred basic solutions are those prepared with ammonium hydroxide, sodium hydroxide or AMP-95, 95 percent (2 amino 2 methyl, 1 propanol) available from International Minerals and Chemical.

The rheology of the paste is tested on a recording Brookfield Viscometer. The number 3 spindle on the Brookfield is inserted in the paste and rotated until the spring is completely wound. The spindle is released and the spring unwinds until the resistance to shear of the paste equals the strength of the spring. A sharp yield point is necessary to produce a tile having the desired appearance. If the yield point of the paste is not sharp, the wet tile formulation will not yield under the oscillating bar used during production and the tile will not have the proper aesthetic appearance.

The neutralized paste having the necessary rheology is then mixed with mineral wool. The mineral wool is present in an amount of from about 5 to about 50 parts based on the total wet weight of the tile formulation. Preferably, the mineral wool is present in an amount of from about 15 to about 25 weight percent based on total weight of the wet ceiling tile compound. The paste and the mineral wool are combined in a mixer and beaten to break up the mineral wool fibers. The mixed formulation is then cast into molds and smoothed with an oscillating bar which causes the formulation to flow under the bar as it yields in viscosity to give the desired appearance.

The tile is then placed in an oven at 300° F. until dry. The drying time is determined by calculating the dry weight of the total tile contents and determining the dry weight of the mold and the foil-kraft laminate. The tile is then removed from the oven after approximately an hour and weighed. If the weight is not equal to the dry weight of the mold and tile, the tile is returned to the oven and a second cycle of drying continues for about another hour. The mold is removed and reweighed, when the tile consecutively maintains the same weight close to the dry weight of the total tile contents and the dry weight of the mold and the foil-kraft laminate for three cycles, the drying is discontinued and the tile is recorded as being dry after the first dry cycle.

The tiles are then tested for dimensional change i.e., sagging or warping of the resultant tile in humid conditions. The dimensional change is determined by suspending a 12 × 12 inches tile horizontally by the edges a known distance (x) from a fixed point on the ceiling. The tile is then cycled three times through conditions of 70° F. and 50 percent relative humidity for a period of 24 hours then, 80° F. and 80 percent relative humidity for a period of 24 hours and then 70° F and 50 percent relative humidity for a period of 24 hours. The distance is then measured as x plus dimensional change.

EXAMPLES

Example 1 and Comparative Example A

Into a 1-liter, glass reactor immersed in a temperature controlled water bath are added 371 grams (g) of deionized water, 6.0 g of a 1 percent active aqueous pentasodium diethylene triamine pentaacetate solution and 3 g of alkylphenoxy poly (ethyleneoxy) ethyl ester of phosphoric acid (anionic surfactant). Heat the reactor to about 80° C. The reactor is purged with nitrogen and over a 3-hour and 10-minute period is added a monomer stream containing 168.0 g of methylmethacrylate, 60 g of methacrylic acid and 12 g of ethyl acrylate.

Beginning at the start of the monomer addition is added over a 4-hour period an aqueous stream containing 123 g of deionized water, 0.3 g of sodium hydroxide, 1.5 g of sodium persulfate and 13.3 g of a 45 percent active surfactant solution. Following the addition of the first monomer stream, an additional monomer stream of 60 g of ethyl acrylate is added over 50 minutes. The reactor is maintained at 85° C. for 1 hour and then cooled.

The latex is then incorporated into the ceiling tile in the following manner. A paste of the water, clay and latex is made. The paste contains 134 g of kaolin clay, 429.7 g of the above latex and 2,634 g of water. The pH of the latex paste is adjusted with base to a pH of 9 to 9.5. The rheology of the paste is determined by running the yield point on a recording Brookfield Viscometer.

The number 3 spindle on the Brookfield is inserted in the paste and rotated until the spring is completely wound. The spindle is released and the spring unwinds until the resistance to shear of the paste equals the strength of the spring. A sharp yield point is necessary to produce a tile having the desired appearance. FIG. 1 illustrates the sharp yield point of the paste from Example 1.

3,198 Grams of the paste is then mixed with 4 g of defoamer and 775 g of mineral wool. The paste, defoamer and mineral wool are combined in the bowl of a Hobart mixer. The combination is beaten at No. 1 speed for 45 seconds, then 3 minutes at No. 2 speed to break the mineral fibers into pieces the size of wheat grain.

The mixture is then put into a 1 inch high, 12 inch by 12 inch stainless steel mold placed on a foil-kraft laminate with the foil down away from the compound The compound fills the mold slightly over full. A plastic bar with a tapered edge is moved quickly back and forth as it doctors off excess compound to simulate an oscillating bar in production. The compound having the correct rheology will break under the shear of the bar to give the desired appearance.

Figure 4:
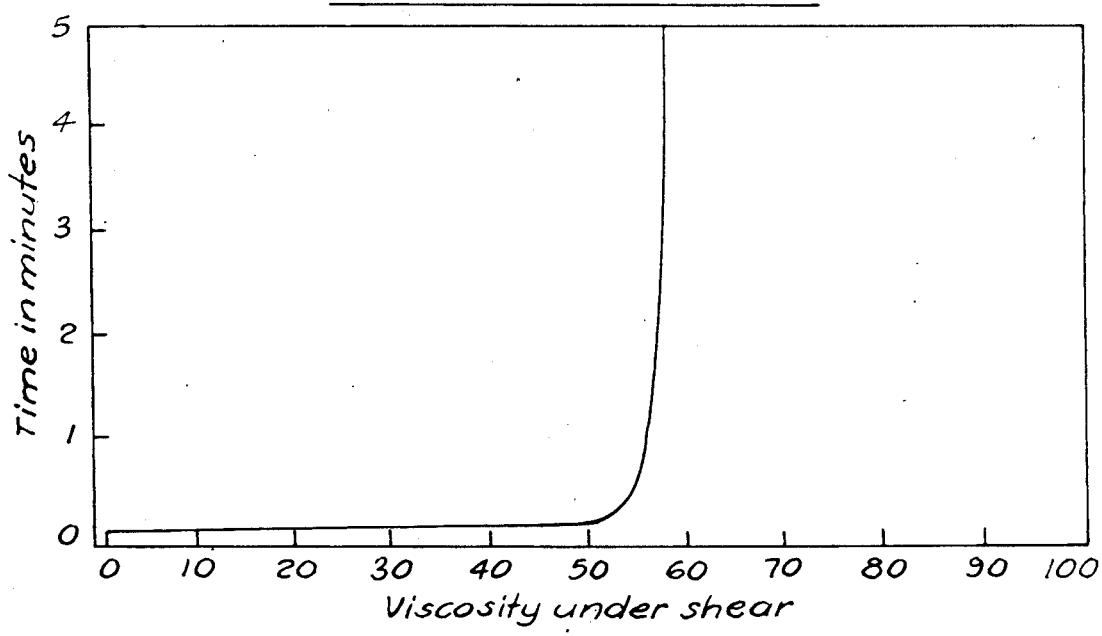

A comparative ceiling tile is made similarly to the tile of Example 1. However, 162 grams of pearl starch is used as the binder instead of latex. The starch and clay are added to near boiling water to solubilize the starch. The paste is not neutralized. The starch paste is Comparative Example A. The sharp yield point of Comparative Example A is shown in FIG. 4.

The tile made from the paste of Comparative Example A is then tested for dimensional change and drying rate as compared to the tile made with the latex from Example 1.

The dimensional change is determined by suspending a 12 × 12 inches tile horizontally by the edges a known distance (x) from a fixed point on the ceiling. The tile is then cycled through conditions of 70° F. and 50 percent relative humidity for a period of 24 hours then, 80° F. and 80 percent relative humidity for a period of 24 hours and then 70° F. and 50 percent relative humidity for a period of 24 hours three times. The distance is then measured as x plus dimensional change. The tile made with starch showed a dimensional change of 0.017 inches and the tile from Example 1, using latex as the binder, showed a dimensional change of only 0.006 inches.

Examples 2-3

Yield point data

Other latexes are made similarly to Example 1. However, the monomers for Example 2 are 46 parts methylmethacrylate, 20 parts methacrylic acid and 4 parts butyl acrylate added over 2 hours and 50 minutes, and a late feed of 30 parts butyl acrylate added over 1 hour and 10 minutes. Example 3 monomer feeds are 56 parts methylmethacylate, 20 parts methacrylic acid and 4 parts butyl acrylate added over 3 hours and 10 minutes; the late feed is 20 parts butyl acrylate added over 50 minutes. The latexes are then incorporated into tiles by the process described in Example 1. Each example imparts the correct rheology as an element of the paste as described above in Example 1. Each of Examples, 1-3 recorded a sharp yield point (see FIGS. 1-3) when measured on the recording Brookfield as described above. The sharp yield point of Comparative Example A from above, made from starch and not latex as the binder is shown in FIG. 4. The sharp yield points of FIGS. 1-4 illustrate the necessarily similar rheological properties of the latex binder compared with the starch binder.

Examples 4-6

Drying Rates

Example tiles 4-6 are made with the latex from Example 1 using: (Example 4) ammonium hydroxide as the neutralent; (Example 5) sodium hydroxide as the neutralent; and (Example 6) AMP-95, 95 percent (2 amino 2 methyl, 1 propanol) available from International Minerals and Chemical, as the neutralent.

The wet tile is placed in an oven at 300° F. to dry. The tile made with starch required 16 hours of dry time, Example 4 required 7 hours of dry time, Example 5 required 9 hours, and Example 6 required 9 hours.

The results from the dimensional stability test and dry time test illustrate the advantages of using latex as the binder for ceiling tile over starch without sacrificing the required aesthetic appearance of the tile which starch provides, achieved through the proper rheological properties of the paste used in making the tiles.

Comparative Examples B and C

Yield Points of Latexes Prepared without a Late Feed

Figure 5:
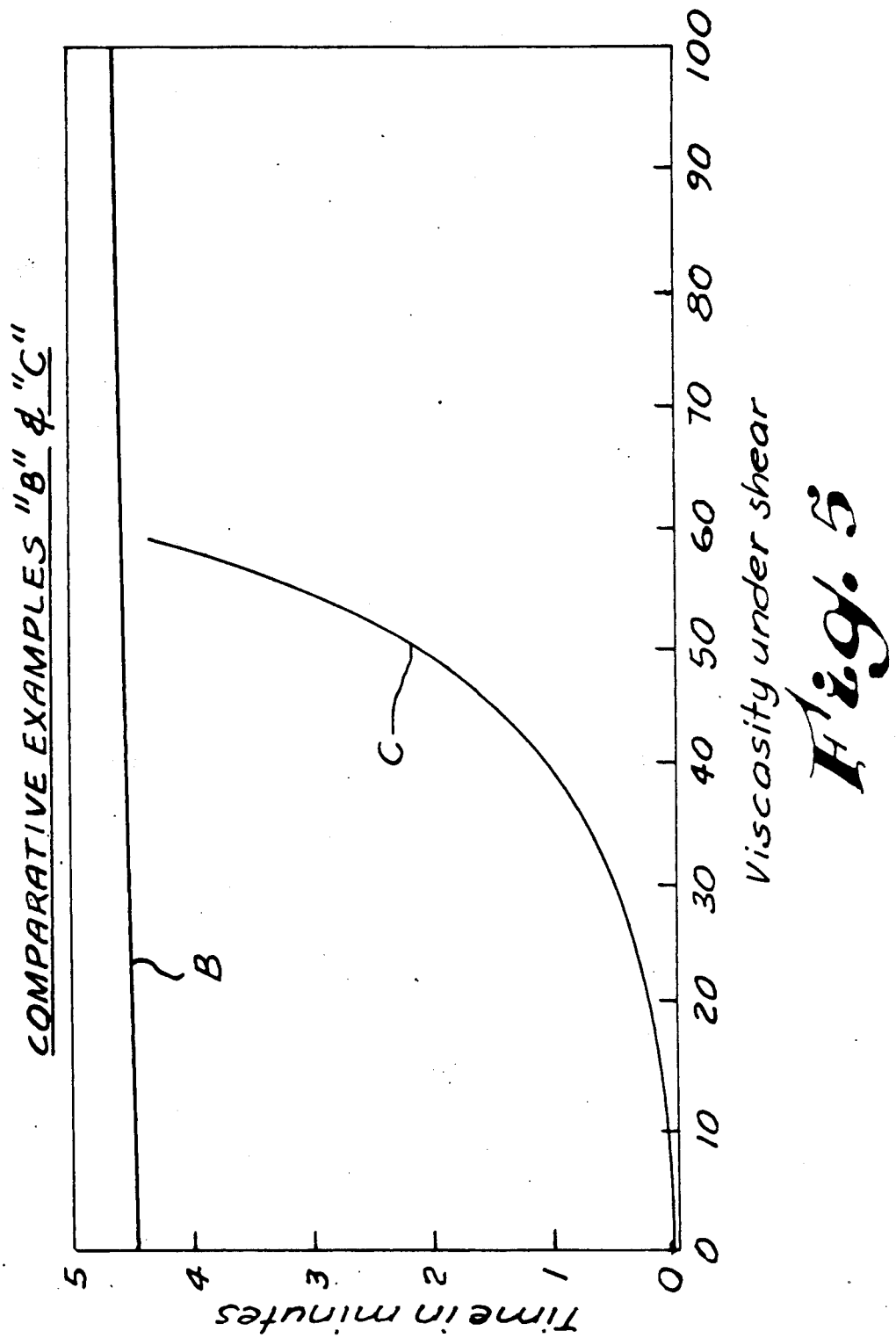

FIG. 5, Example B represents the yield point for a paste prepared from a latex prepared similarly to Example 1, using 56 parts methyl methacrylate, 24 parts ethyl acrylate, and 20 parts methacrylic acid however, the latex is prepared without using the late feed of a nonionic vinyl monomer as in Example 1. The yield test shows virtually no resistance of the paste made with such a latex compared with the yield points of the Examples of the invention shown in FIGS. 1-3. A paste exhibiting such a lack of resistance can not be used to prepare a tile with the proper aesthetic appearance.

FIG. 5, Comparative Example C represents the yield point for a paste prepared from a latex prepared similarly to Example 1, using 50 parts ethyl acrylate, 30 parts vinyl acetate, 10 parts acrylic acid and 10 parts methacrylic acid; the latex is prepared without using the late feed of a nonionic vinyl monomer as in Example 1. The yield point of the paste is not sharp, compared with the yield points of the Examples of the invention shown in FIGS. 1-3 or the Starch Comparative Example in FIG. 4. A paste exhibiting such a lack of resistance can not be used to prepare a tile with the proper aesthetic appearance. The Comparative Examples B and C demonstrate that the proper rheology of the paste for the present invention depends on the late feed of the nonionic vinyl monomer in the latex preparation.

What is claimed is:

1. A cast ceiling tile which comprises a molded and dried mixture, the mixture before drying comprising:
   (a) water;
   (b) mineral wool;
   (c) an alkali-swellable latex comprising:
      (i) a $C_3$-$C_8$ $\alpha,\beta$-ethylenically unsaturated carboxylic acid monomer in an amount from about 15 to about 60 weight percent based on the weight of the monomers in the copolymer;
      (ii) at least one of a copolymerizable nonionic vinyl monomer in an amount from about 45 to about 30 weight percent based on the weight of the monomers in the copolymer; and
      (iii) an additional late feed of nonionic vinyl monomer in an amount from about 10 to about 40 weight percent based on the weight of the monomers in the copolymer; and
   (d) filler, wherein the mixture before drying is formed by blending the mineral wool with a premixture of water, latex, and filler, said premixture having a sharp yield point when measured with a recording Brookfield Viscometer.

2. The tile of claim 1 wherein the $C_3$-$C_8$ $\alpha,\beta$-ethylenically unsaturated carboxylic acid monomer is selected from the group consisting of acrylic acid; methacrylic acid; a mixture of acrylic acid and methacrylic acid; itaconic acid; fumaric acid; crotonic acid; aconitic acid, half esters of these polycarboxylic acids and mixtures of these polycarboxylic acids.

3. The tile of claim 1 wherein the $C_3$-$C_8$ $\alpha,\beta$-ethylenically unsaturated carboxylic acid monomer is selected from the group consisting of acrylic acid; methacrylic acid; and a mixture of acrylic acid and methacrylic acid.

4. The tile of claim 1 wherein the copolymerizable nonionic vinyl monomer is a $C_2$-$C_{12}$ $\alpha,\beta$-ethylenically unsaturated vinyl monomer selected from the group consisting of the formula:

$$CH_2=CYZ$$

Y is H and Z is —COOR, —$C_6H_4R'$, CN, Cl,

or CH=CH$_2$;
Y is CH$_3$ and Z is —COOR, —$C_6H_4R'$, CN or CH=CH$_2$; or
Y and Z are Cl; and
R is $C_1$-$C_8$ alkyl or $C_2$-$C_8$ hydroxyalkyl;
R' is H, Cl, Br, or $C_1$-$C_4$ alkyl;
R" is $C_1$-$C_8$ alkyl.

5. The tile of claim 4 wherein the copolymerizable $C_2$-$C_{12}$ $\alpha,\beta$-ethylenically unsaturated vinyl monomer is selected from the group consisting of: ethyl acrylate, ethyl methacrylate, methyl methacrylate, 2-ethylhexyl acrylate, butyl acrylate, butyl methacrylate, 2-hydroxyethyl acrylate, 2-hydroxybutyl methacrylate; styrene, vinyltoluene, t-butylstyrene, isopropylstyrene, p- chlorostyrene; vinyl acetate, vinyl butyrate, vinyl caprolate; acrylonitrile, methacrylonitrile, butadiene, isoprene, vinyl chloride and vinylidene chloride.

6. The tile of claim 1 wherein the filler is selected from the group consisting of kaolin clay, talc, calcium carbonate, and wollastonite.

7. A process for preparing cast ceiling tile which comprises:
   (1) preparing a paste comprising:
       (a) filler;
       (b) water and
       (c) an alkali-swellable latex comprising:
           (i) a $C_3$–$C_8$ $\alpha,\beta$-ethylenically unsaturated carboxylic acid monomer in an amount from about 15 to about 60 weight percent based on the weight of the monomers in the copolymer;
           (ii) at least one of a copolymerizable nonionic vinyl monomer in an amount from about 45 to about 30 weight percent based on the weight of the monomers in the copolymer; and
           (iii) an additional late feed of nonionic vinyl monomer in an amount from about 10 to about 40 weight percent based on the weight of the monomers in the copolymer, filler and water;
   (2) adjusting the pH of the paste to greater than about 8, wherein said pH adjusted paste has a sharp yield point when measured with a recording Brookfield Viscometer;
   (3) combining the paste with mineral wool to form a mixture, wherein the mixture yields under an oscillating bar;
   (4) molding the mixture; and
   (5) drying the mixture.

8. The process of claim 7 wherein the $C_3$–$C_8$ $\alpha,\beta$-ethylenically unsaturated carboxylic acid monomer is selected from the group consisting of acrylic acid; methacrylic acid; a mixture of acrylic acid and methacrylic acid; itaconic acid; fumaric acid; crotonic acid; aconitic acid, half esters of these polycarboxylic acids and mixtures of these polycarboxylic acids.

9. The process of claim 7 wherein the $C_3$–$C_8$ $\alpha,\beta$-ethylenically unsaturated carboxylic acid monomer is selected from the group consisting of acrylic acid; methacrylic acid; and a mixture of acrylic acid and methacrylic acid.

10. The process of claim 7 wherein the copolymerizable nonionic vinyl monomers are $C_2$–$C_{12}$ $\alpha,\beta$-ethylenically unsaturated vinyl monomer selected from the group consisting of the formula:

$$CH_2\!=\!CYZ$$

where
Y is H and Z is —COOR, —$C_6H_4R'$, CN, Cl,

or CH=$CH_2$;
Y is $CH_3$ and Z is —COOR, $C_6H_4R'$, CN or CH=$CH_2$; or
Y and Z are Cl; and
R is $C_1$–$C_8$ alkyl or $C_2$–$C_8$ hydroxyalkyl;
R' is H, Cl, Br, or $C_1$–$C_4$ alkyl;
R'' is $C_1$–$C_8$ alkyl.

11. The process of claim 10 wherein the copolymerizable $C_2$–$C_{12}$ $\alpha,\beta$-ethylenically unsaturated vinyl monomer is selected from the group consisting of: ethyl acrylate, ethyl methacrylate, methyl methacrylate, 2-ethylhexyl acrylate, butyl acrylate, butyl methacrylate, 2-hydroxyethyl acrylate, 2-hydroxybutyl methacrylate, styrene, vinyltoluene, t-butylstyrene, isopropylstyrene, p-chlorostyrene; vinyl acetate, vinyl butyrate, vinyl caprolate, acrylonitrile, methacrylonitrile, butadiene, isoprene, vinyl chloride and vinylidene chloride.

12. The process of claim 7 wherein the paste additionally comprises a defoamer.

13. The process of claim 12 wherein the paste comprises from about 50 to about 90 weight percent water, from about 1 to about 20 weight percent filler based on the weight of the paste formulation and from about 1 to about 20 weight percent of latex.

14. The process of claim 13 wherein the pH of the paste is adjusted to from about 8 to about 10.

15. The process of claim 7 wherein the filler is selected from the group consisting of kaolin clay, talc, calcium carbonate, and wollastonite.

16. The process of claim 7 wherein the mineral wool is present in an amount from about 5 to about 50 weight percent based on the total wet weight of the mixture.

* * * * *